US009156615B2

(12) United States Patent
Acevedo et al.

(10) Patent No.: US 9,156,615 B2
(45) Date of Patent: Oct. 13, 2015

(54) METHODS OF USE OF A MEDIA MOBILITY UNIT (MMU)

(71) Applicant: International Business Machines Corporation, Armonk, NY (US)

(72) Inventors: Jesus R. Acevedo, Tucson, AZ (US); Jonathan W. Ain, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/149,750

(22) Filed: Jan. 7, 2014

(65) Prior Publication Data

US 2014/0119876 A1 May 1, 2014

Related U.S. Application Data

(62) Division of application No. 13/105,844, filed on May 11, 2011, now Pat. No. 8,687,315.

(51) Int. Cl.
*G11B 15/68* (2006.01)
*B65G 1/137* (2006.01)
*G11B 17/22* (2006.01)

(52) U.S. Cl.
CPC .............. *B65G 1/137* (2013.01); *B65G 1/1371* (2013.01); *G11B 15/68* (2013.01); *G11B 15/689* (2013.01); *G11B 15/6835* (2013.01); *G11B 17/22* (2013.01)

(58) Field of Classification Search
CPC ........ G11B 5/68; G11B 5/6835; G11B 5/689; G11B 15/68; G11B 15/6835; G11B 15/689

USPC .......................................................... 360/92.1
See application file for complete search history.

(56) References Cited

U.S. PATENT DOCUMENTS

| 4,864,438 | A  | 9/1989  | Munro              |
| 5,357,495 | A  | 10/1994 | Solhjell            |
| 5,395,199 | A  | 3/1995  | Day, III et al.    |
| 5,700,125 | A  | 12/1997 | Falace et al.      |
| 6,314,338 | B1 | 11/2001 | Billington         |
| 6,438,623 | B1 | 8/2002  | Ryan               |
| 6,480,905 | B1 | 11/2002 | Jesionowski et al. |
| 6,550,391 | B1 | 4/2003  | Ostwald et al.     |
| 6,574,173 | B1 | 6/2003  | Manes              |
| 6,808,353 | B2 | 10/2004 | Ostwald et al.     |
| 6,810,306 | B1 | 10/2004 | Ostwald            |
| 7,085,090 | B2 | 8/2006  | Brume              |
| 7,199,967 | B2 | 4/2007  | Benson et al.      |

(Continued)

FOREIGN PATENT DOCUMENTS

JP          08030405      2/1996

OTHER PUBLICATIONS

Restriction/Election Requirement from U.S. Appl. No. 13/105,844 dated Jan. 22, 2013.

(Continued)

*Primary Examiner* — Craig A. Renner
(74) *Attorney, Agent, or Firm* — Zilka-Kotab, PC

(57) ABSTRACT

Aspects of the present invention relate to use of a MMU. In one embodiment, a method for transporting a media cartridge includes receiving one or more media cartridges from a source media library, storing the one or more media cartridges in a holding portion of a media mobility unit, sensing at least an approximate location of the media mobility unit, and transporting the one or more media cartridges to a destination media library. Additional embodiments are also presented.

14 Claims, 6 Drawing Sheets

(56) References Cited

U.S. PATENT DOCUMENTS

| | | |
|---|---|---|
| 7,421,312 B2 | 9/2008 | Trossell |
| 7,710,684 B2 | 5/2010 | Hashimoto |
| 8,687,315 B2 | 4/2014 | Acevedo et al. |
| 2001/0000062 A1* | 3/2001 | Ostwald et al. ............ 104/88.02 |
| 2005/0237662 A1 | 10/2005 | Chamorro et al. |
| 2012/0287532 A1 | 11/2012 | Acevedo et al. |
| 2014/0074281 A1 | 3/2014 | Acevedo et al. |

OTHER PUBLICATIONS

Non-Final Office Action from U.S. Appl. No. 13/105,844 dated May 1, 2013.
Final Office Action from U.S. Appl. No. 13/105,844 dated Aug. 29, 2013.
Notice of Allowance and Fee(s) Due from U.S. Appl. No. 13/105,844 dated Nov. 13, 2013.
Acevedo et al., U.S. Appl. No. 13/105,844, filed May 11, 2011.
Acevedo et al., U.S. Appl. No. 14/078,427, filed Nov. 12, 2013.
Requirement for Restriction from U.S. Appl. No. 14/078,427, dated Dec. 4, 2014.
Non-Final Office Action from U.S. Appl. No. 14/078,427, dated Feb. 18, 2015.
Final Office Action from U.S. Appl. No. 14/078,427, dated Jul. 30, 2015.

* cited by examiner

METHODS OF USE OF A MEDIA MOBILITY UNIT (MMU)

RELATED APPLICATIONS

This application is a divisional of copending U.S. patent application Ser. No. 13/105,844, filed May 11, 2011, which is herein incorporated by reference.

BACKGROUND

The present invention relates to data storage systems using media cartridges and media libraries, and more particularly, to a media mobility unit for moving media cartridges between media libraries.

Media libraries serve as practical solutions to the massive data storage and redundancy requirements of modern computing operations. Media libraries host a finite number of media volumes for storing data, and typically these volumes are classified as tape or disk, depending on the data storage format. In order to meet access and redundancy requirements, many operations employ multiple libraries at multiple access points. When using a plurality of access points without universal or shared accessibility, physical volumes are occasionally unmounted from one media library and mounted to another in order to provide access to the requested volume. In addition, new volumes may be occasionally be used to replace full volumes and permit storage of additional new data.

Typically, these physical movements are performed by human technicians manually entering a command to unmount a source volume from a source library, receiving the requested volume from the source library, carrying the source volume to a destination library, placing the source volume in a destination library receptacle, and entering a command to mount the source volume in the destination library.

Some recent approaches have endeavored to automate the process of unmounting, receiving, transferring, and mounting volumes from one media library to another by way of mechanical arms, tracks, and/or rails to transfer volumes between two libraries. In these approaches, however, media libraries must be in sufficiently close physical proximity such that the arm, track, and/or rails may span the distance between source and destination media libraries. This proximity requirement places physical limits on the arrangement of media libraries in a physical space. In addition, since each library must be attached to an arm, track, or railing as well as a mechanism for moving media along the arm, track, or railing, it can be very expensive to replace existing media libraries with those having the requisite mobility mechanisms. Even if media libraries may be retrofit with such mobility devices, interfacing multiple libraries becomes increasingly problematic as the number of libraries increases, again due in large part to spatial limitations.

However, as computational resources and data security continue to accrue significance in this information age, current approaches to efficiently move media volumes between media libraries is becoming increasingly unsuitable for evolving performance requirements. Therefore, it would be a useful endeavor to develop a system and method for providing mobility to a network of media libraries without incurring the enormous cost of replacing current libraries or the spatial limitations imposed by permanent tracks, arms, and/or rails connecting media libraries in physical proximity. Furthermore, it would be advantageous to eliminate the spatial limitations and proximity requirements of currently envisioned media mobility systems.

BRIEF SUMMARY

According to one embodiment, a method for transporting a media cartridge includes receiving one or more media cartridges from a source media library, storing the one or more media cartridges in a MMU, sensing at least an approximate location of the MMU, and transporting the one or more media cartridges to a destination media library.

Other aspects and embodiments of the present invention will become apparent from the following detailed description, which, when taken in conjunction with the drawings, illustrates by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a" "an," and "the" include plural referents unless otherwise specified.

According to one general embodiment, a data storage system includes a source media library configured to send a message to a destination media library when a media cartridge from the source media library is sent to the destination media library using a media mobility unit (MMU) comprising a media cartridge holding portion for storing media cartridges, wherein the source media library is configured to receive a message from the destination media library when the destination media library receives the media cartridge sent from the source media library to the destination media library using the MMU.

In another general embodiment a data storage system includes a destination media library configured to receive a message from a source media library when a media cartridge from the source media library is sent to the destination media library using a media mobility unit (MMU) comprising a media cartridge holding portion for storing media cartridges, wherein the destination media library is configured to send a message to the source media library when the destination media library receives the media cartridge from the source media library.

In another general embodiment, a MMU includes a media cartridge holding portion for storing media cartridges, a sensing mechanism for sensing at least an approximate location of the holding portion in relation to other objects, a drive mechanism for moving the holding portion from a source media library to a destination media library, and a power source electrically coupled to at least one of the sensing mechanism and the drive mechanism for providing current to the at least one of the drive mechanism and the sensing mechanism.

In yet another general embodiment, a method for transporting a media cartridge includes receiving one or more media cartridges from a source media library, storing the one or more media cartridges in a MMU, sensing at least an approximate location of the MMU, and transporting, the one or ire media cartridges to a destination media library.

Figure 1:
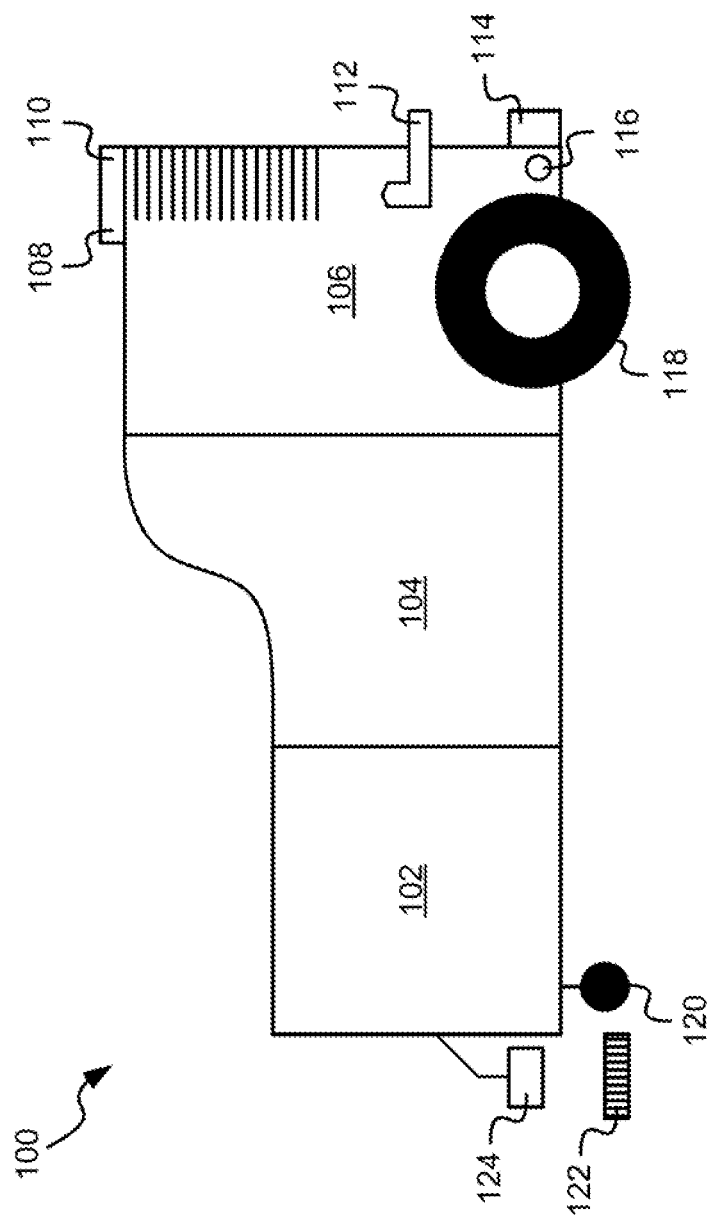
FIG. 1 illustrates a schematic of a media mobility unit from a side view, according to one embodiment.

Referring now to the figures, FIG. 1 shows a schematic of a media mobility unit (MMU) 100 from a side view, according to one embodiment. As shown, the MMU 100 includes three portions: a power source portion 102, a connecting portion 104, and a cartridge holding portion 106. The MMU 100 also includes a mechanism for moving the unit, shown as a pair of front drive wheels 118 (only one wheel is visible due to the drawing angle) capable of providing forward or reverse motion to the unit independently to facilitate motion, turning, and pivoting, and a single castor wheel 120 adapted for providing support to the MMU 100. In another embodiment, the drive wheels 118 may each provide a forward or reverse motion to the MMU 100 while the rear wheel 120 provides a direction. In yet another embodiment, there may be more than one rear wheel 120, which may or may not provide direction to the MMU 100.

With continuing reference to FIG. 1, the power source portion 102 may include a rechargeable power source, such as a rechargeable battery, and may be adapted for being recharged at designated stations, such as while being, docked at a media library. Furthermore, the power source portion 102 may include additional components, such as a position sensor or laser reader 124, swiveling wheels 120, etc In one embodiment, the power source portion 102 may include non-rechargeable batteries that are replaceable, a power source that operates from contact with a power supply (such as one used for light rail train engines), or any other power source as would be understood by one of skill in the art upon reading the present descriptions.

In one embodiment, a laser reader 124 extends proximally from the rear side of the MMU 100. The laser reader 124, as shown, is adapted for reading one or more barcodes 122 which may be located at positions along the floor, on walls, on the ceiling, in a grid, or anywhere else that the laser reader 124 is capable of reading them as the MMU 100 passes by. The barcodes 122 may have any dimension and may comprise any pattern adapted for being recognized by the laser reader 124. In one embodiment, the bar codes 122 may be positioned at each floor tile (such as floor tiles measuring 24 in.×24 in. or any other dimension) such that movement of the MMU 100 is detectable at each floor tile. Of course, many other barcode 122 positions are possible, and the positioning of the barcodes 122 is not meant to be limited in any way by this description.

In more embodiments, more than one laser reader 124 may be used, and each laser reader 124 may be positioned at any location on the MMU 100 that facilitates the reading of the barcodes 122, according to various embodiments, such as on the media cartridge portion 106, on the connecting portion 104, on the bottom, on the top, on one or more sides, etc. As the MMU 100 travels from a source media library to a destination media library, the barcodes 122 may be read by the laser reader 124 such that a current position of the MMU 100 is detectable during the transit, such that proper retrieval and delivery of media cartridges may be accomplished.

In another approach, the laser reader 124 may function as a position sensor to determine the position of the MMU 100. Of course, alternate embodiments may utilize similar variations of a barcode and laser reader to navigate between and identify various media libraries in a storage system. Furthermore, alternate embodiments may utilize similar variations of a barcode and laser reader to determine the position of the MMU 100.

In another embodiment, the MMU 100 may comprise a radio frequency identification (RFID) device to determine positional information of the MMU 100, such as an RFID reader. In this embodiment, RFID tags may be positioned throughout a storage system such that each media library is represented, and paths between the media libraries are designated by the RFID tags.

According to one embodiment, the swivel wheels 120 protrude from the bottom of the MMU 100 near the rear and provide pivoting capability and lateral mobility to the MMU 100. Any type of pivoting wheel may be used, such as a castor wheel, a wheel coupled to a swiveling base, ball bearings, etc.

Referring still to FIG. 1, the cartridge holding portion 106 may be located at a distal end of the MMU 100 and coupled to the power source portion 102 via the connecting portion 104. In some embodiments, a connecting, portion 104 is not used when the power source portion 102 connects to the cartridge holding portion 106 directly. The cartridge holding portion 106 may further be connected to the drive wheels 118, which may confer longitudinal mobility to the MMU 100 by driving it along a surface upon receiving a request to retrieve or store a media cartridge or move to a new location in a grid-based location system (GBLS)

The cartridge holding portion 106 additionally includes several components adapted for conferring various capabilities to the MMU 100.

In one approach, the cartridge holding portion 106 includes sensors. For example, one or more proximity sensors 110 may be adapted for conveying information about proximity of nearby objects to the MMU 100 as it travels between media libraries. In another example, one or more fiducial sensors 108 may be coupled to the cartridge holding portion 106 that may be adapted for communicating alignment information as the MMU 100 attempts to interface with a media library, which is equipped with a corresponding sensor or alignment mechanism.

Additionally, the cartridge holding portion 106 may comprise locking, pins 116 located at a lower distal end of the MMU 100 and adapted for engaging locking pin slots of media libraries upon docking with the media library in order to avoid unexpected or undesirable motion during a media transfer operation. Alternatively, the cartridge holding portion 106 may include locking pin slots 116 adapted for receiving locking pins deployed from a media library upon docking the MMU 100 with the media library in order to avoid unexpected or undesirable motion during a media transfer operation. In either case, the locking pins and locking pin slots may be constructed and operate in any manner as known to one having ordinary skill in the art.

Furthermore, in one embodiment, there may be a power charger 114 located on a distal end of the MMU 100 and adapted for charging the power source portion 102 of the MMU 100 upon docking with a media library.

With continuing reference to FIG. 1, the cartridge holding portion 106 may include a communication input/output (I/O) 112 for receiving input data from a media library and delivering output data to a media library. This I/O connection 112 may be used for transferring instructions from a source library to the MMU 100 that instructs the MMU 100 to travel to a destination library located remotely from the source media library to move a media cartridge therebetween. Of course, any other instructions may be provided to the MMU 100 as would be understood by one of skill in the an upon reading the present descriptions. The I/O connection may be of any type as would be known in the art.

According to one approach, the source media library (such as from a library control manager) may send a message to the destination media library and/or some other system (such as a storage controller) that the source media library is sending a media cartridge to the destination media library. When the media cartridge is received by the destination media library, the destination media library may send a message to the source media library and/or some other system that the media cartridge from the source media library was received at the destination media library. This ensures that there is at "handshake" between the media libraries such that a media cartridge in transit is not lost during, the transportation thereof. Otherwise, once the media cartridge was sent from the source media library, there would be no evidence of its intended delivery or that it left the source media library. Of course, other methods may be used to ensure that media cartridge visibility and accountability is maintained during the transportation process, as would be understood by one of skill in the art upon reading the present descriptions.

In some further approaches, there may be a time period associated with when the media cartridge is sent from the source media library and when it is delivered to the destination media library such that if the message indicating the media cartridge's arrival is not received by the source media library and/or some other system prior to the expiration of this time period, an alert may be issued that a problem has arisen in the transportation of the media cartridge. In response to this alert, a technician, administrator, or some other suitable person may determine what has caused the delay in the delivery of the media cartridge.

According to one embodiment, the source media library may be configured to send a message to a destination media library when a media cartridge from the source media library is sent to the destination media library, and the source media library may be configured to receive a message from the destination media library when the destination media library receives the media cartridge from the source media library.

In another embodiment, the destination media library may be configured to receive a message from a source media library when a media cartridge from the source media library is sent to the destination media library, and the destination media library may be configured to send a message to the source media library when the destination media library receives the media cartridge from the source media library.

In one approach, the cartridge holding portion 106 may include one or more cartridge storage devices. The cartridge storage devices include a plurality of slots capable of securely holding media volumes during MMU 100 motion between media libraries, as will be described in reference to FIG. 2.

Referring again to FIG. 1, according to one embodiment, a MMU 100 comprises a media cartridge holding portion 106 for storing media cartridges, at least one sensing mechanism 108 and/or 110 for sensing at least an approximate location of the holding portion 106 in relation to other objects, a drive mechanism 118 for moving the holding portion 106 from a source media library to a destination media library, and a power source 102 electrically coupled to at least one of the sensing mechanism 108 and/or 110 and the drive mechanism 118 for providing current to the at least one of the drive mechanism 118 and the sensing mechanism 108 and/or 110. Of course, power may also be supplied to other components of the MMU 100, and other components may exist, as described previously.

Figure 2:
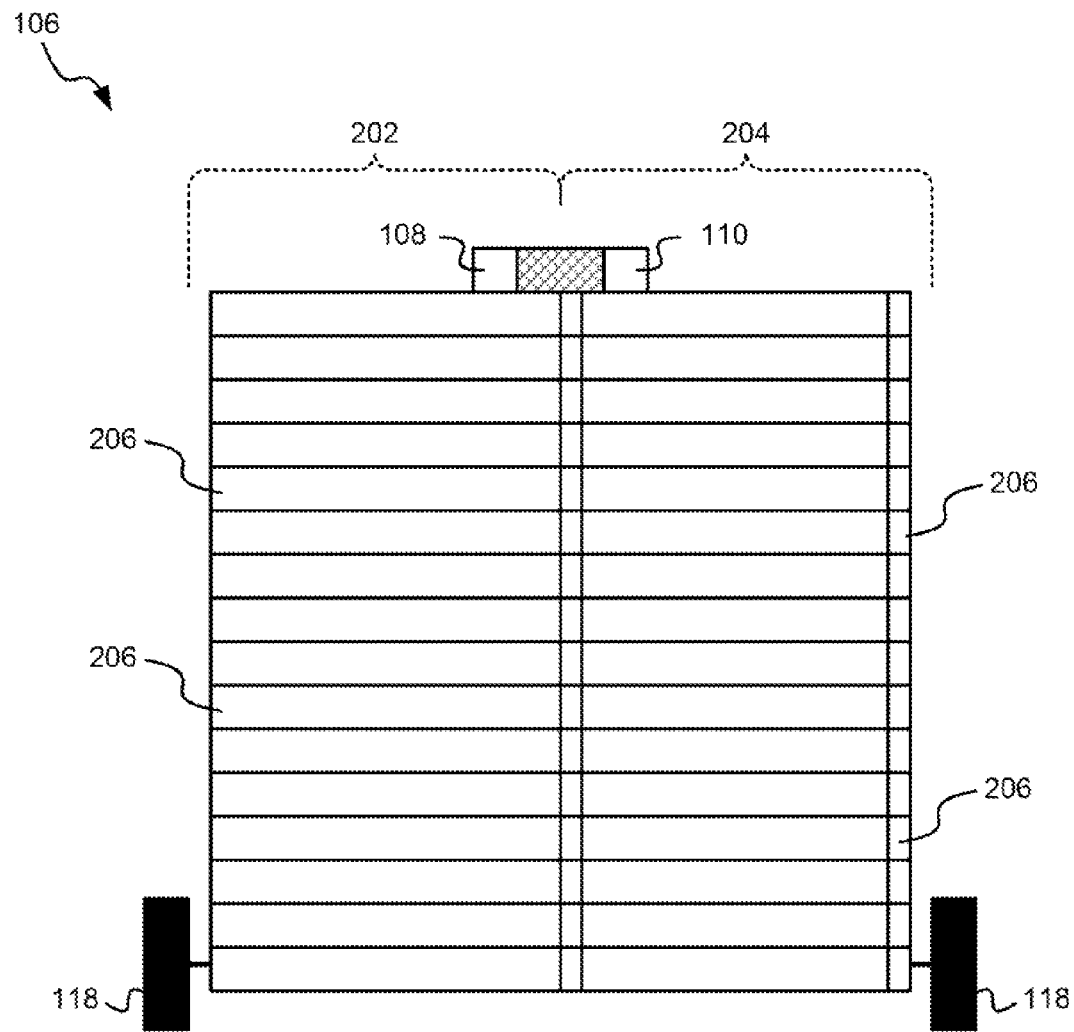
FIG. 2 illustrates a schematic of a media mobility unit from a distal view, according to one embodiment.

Referring now to FIG. 2, in one embodiment the cartridge holding portion 106 of the MMU may have the capability to hold various types of media cartridges, such as magnetic tape cartridges (e.g., linear tape-open (LTO) compatible tape cartridges and/or 3592 format tape cartridges, etc.), disc cartridges, etc. In one approach, the cartridge holding portion 106 may include more than one configuration of cartridge storage devices 202 and/or 204. As shown, the cartridge holding portion 106 includes a plurality of storage slots 206, each capable of storing a media volume from a media library. In the embodiment shown in FIG. 2, the cartridge holding portion 106 is depicted with a first cartridge holder 202 and a second cartridge holder 204. While this embodiment depicts a cartridge holding portion 106 with two types of cartridge holders, alternative embodiments may hold any number of cartridge holders, limited only by the physical dimensions and docking, capabilities of the associated media libraries.

in operation, the cartridge storage devices 202 and/or 204 are adapted for interfacing with a picker of a media library in order to transfer media cartridges between the MMU and the media library. In this manner, the MMU may securely store the retrieved volume(s) in the cartridge storage device 202 and/or 204, retrieve the stored volume(s) upon arrival at a destination library, and deliver the retrieved volume(s) to a destination media library, in one approach.

Figure 3:
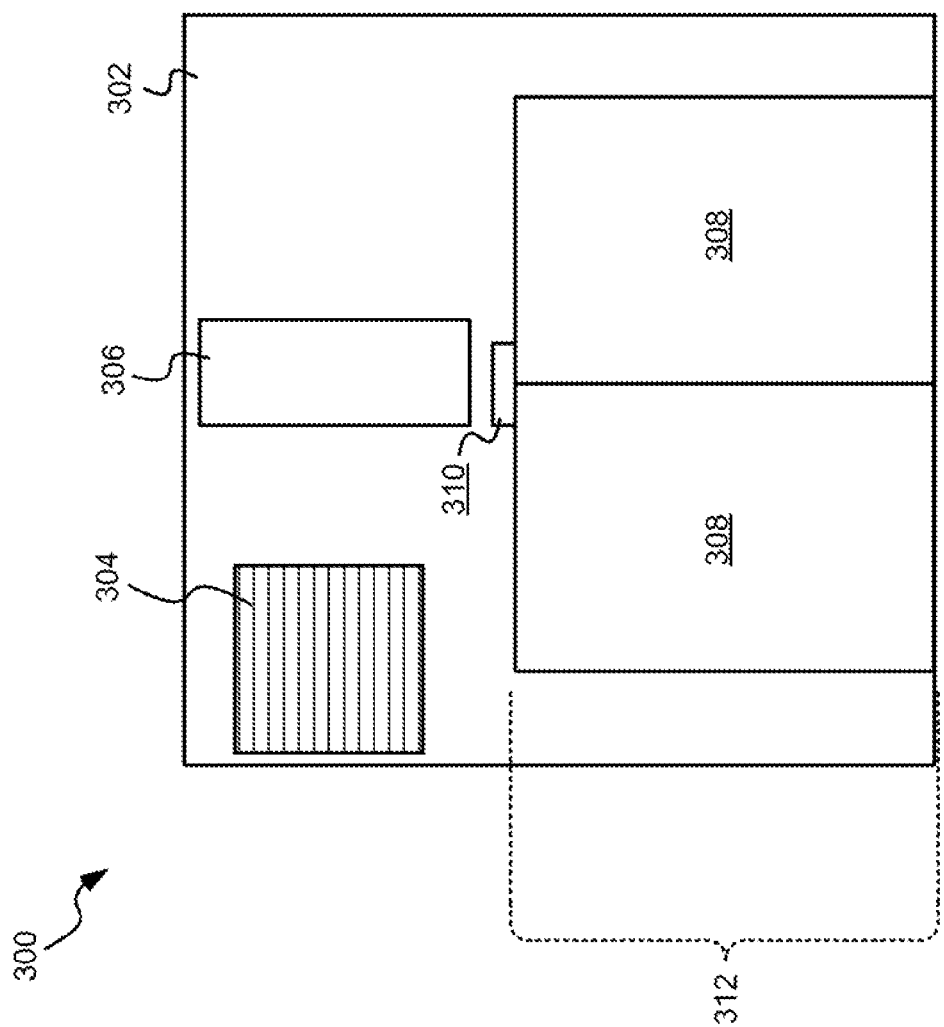
FIG. 3 illustrates a schematic of a media library from a front view, according to one embodiment.

Referring now to FIG. 3, a media library 300 is shown, according to one embodiment. As depicted, the media library 300 includes a housing 302, an operator panel 304, an I/O station 306, and a docking, station 312. The docking station 312 may further include one or more doors 308, and a fiducial 310. In operation, the docking station 312 may serve as an interface point for one or more MMUs servicing a GBLS with associated media libraries 300.

In another other embodiment, and with continuing reference to FIG. 3, the one or more doors 308 may be configured to open via spring-loading or other automated opening mechanisms as known to one having ordinary skill in the art. Other embodiments may be adapted to automatically trigger the opening mechanism and open the doors 308 when a MMU begins to interface with the docking station 312 of the media library 300. In addition, the doors 308 may similarly be configured to automatically close when a MMU detaches from the docking station 312 of the media library 300. Alternatively, the doors 308 may be triggered to open upon successful engaging of the locking pins 116 with corresponding locking pin slots, etc.

Figure 4:
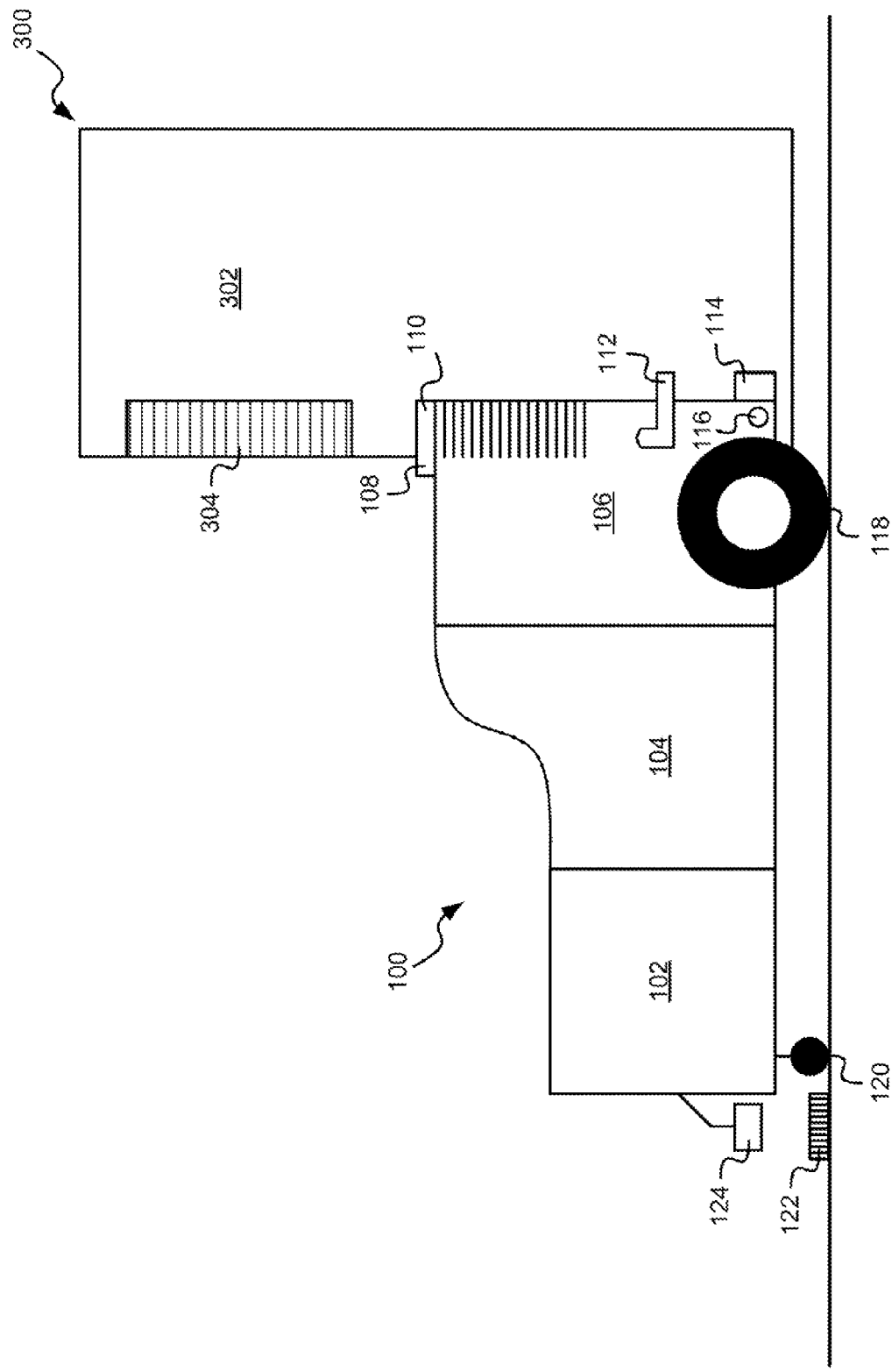
FIG. 4 illustrates a schematic of a media mobility unit docked with a media library from a side view, according to one embodiment.

Referring, now to FIG. 4, a MMU 100 is shown interfacing with a docking station 312 of a media library 300, according to one embodiment. As shown, the MMU 100 is docking with the media library 300 at the level where the doors are located, such that an operator would still be able to access the operator panel 304. Of course, any configuration may be used as would be understood by one of skill in the art upon reading the present descriptions.

Figure 5:
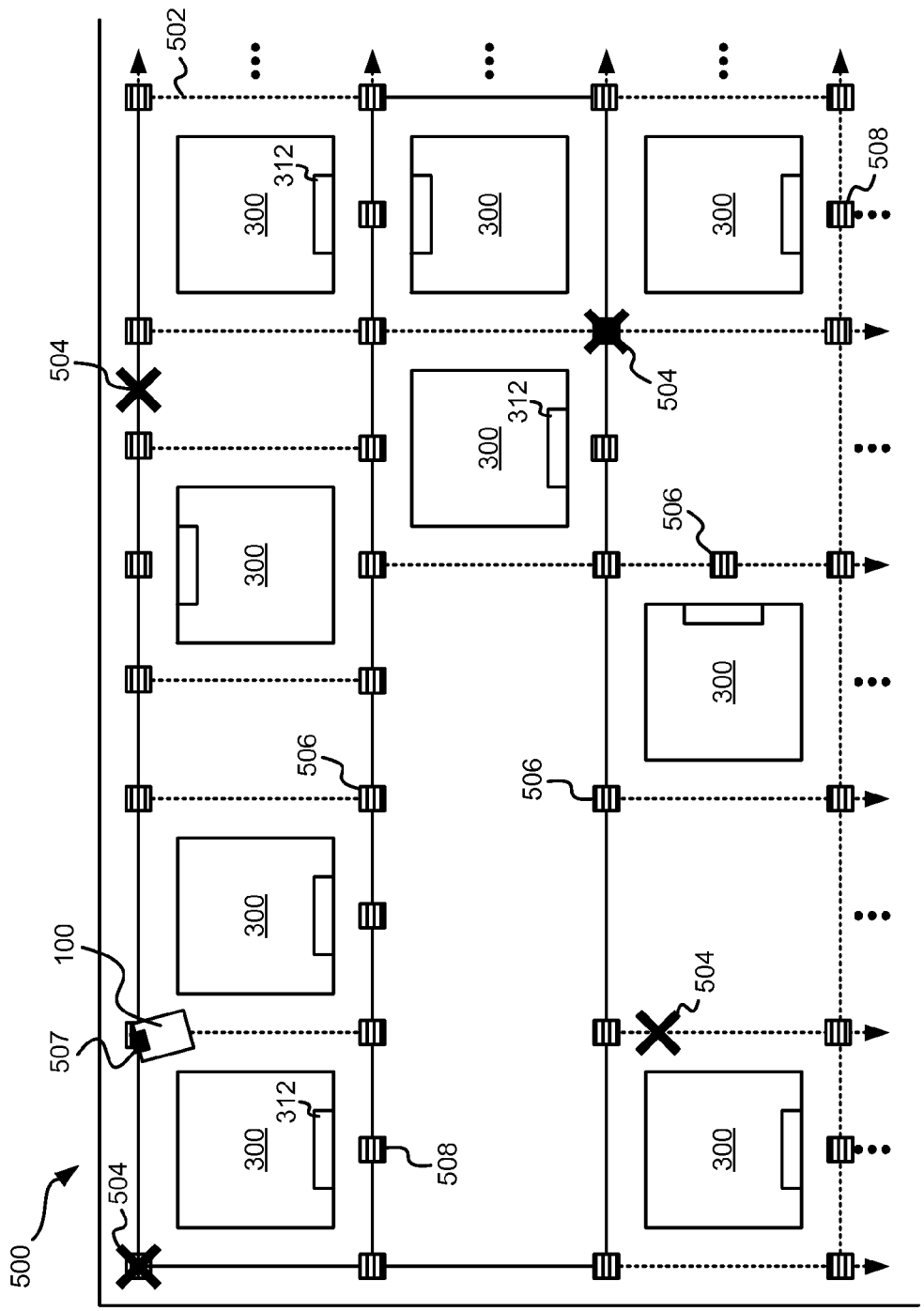
FIG. 5 illustrates a diagrammatic layout of a media library being serviced by a media mobility unit, according to one embodiment of a grid-based location system (GBLS).

Referring now to FIG. 5, a GBLS 500 and corresponding MMU 100 for transporting media cartridges between a source and destination media library are shown, according to one embodiment. As shown, the GBLS 500 includes a plurality of indicators 506 on one or more surfaces, the plurality of indicators 506 being positioned to be readable by a device 507 on the MMU 100. In one embodiment, the indicators 506 may be barcodes, and the device 507 for reading the indicators 506 may be a barcode reader. In another embodiment, the indicators 506 may be RFID tags, and the device for 507 reading the indicators 506 may be a RFID reader. Of course, any other indicator and device capable of reading the indicators may be used as one of skill in the art would understand upon reading the present descriptions.

The indicators 506 are positioned in pathways 502 between a plurality of media libraries 300, each media library having an associated docking station 312 and an indicator 508 designating the position of the docking station 312. In operation, the MMU 100 may travel along a plurality of pathways 502 from a source media library to a destination media library, detect a proximate media library 300 via a proximity sensor, read a media barcode 506, and identify whether the particular library is the appropriate destination by comparing an observed barcode value to a requested barcode value. When the MMU 100 identifies a library as the appropriate destination, it may furthermore initiate a docking sequence with the docking station 312 of the destination library.

Alternatively, in another embodiment, the MMU 100 may be provided with a set of addresses for each media library 300 in the GBLS 500 and additionally with appropriate travel pathways 502 for traversing the GBLS 500 from library to library.

In still another embodiment, the MMU may be provided with optimization algorithms such as machine-learning, to maximize efficiency of media mobility according to one or more user-defined variables such as travel time; travel distance, number of pickups or deliveries, etc. in such an approach, the MMU 100 may calculate an optimum travel route according to user preferences and as understood by one having ordinary skill in the art.

Furthermore; in yet another embodiment, the MMU 100 may record transit data in real-time as it mobilizes media between libraries. Such data may include travel time, travel distance, number of receipts or deliveries, etc. Upon a request to move media between libraries, the MMU 100 may calculate an optimum travel protocol by comparing real-time data to optimization criteria, including user-defined criteria.

In some approaches, the MMU 100 may encounter one or more obstacles 504 during transit between media libraries 300. To prevent collisions, the MMU 100 may detect such obstacles via a proximity sensor or may be instructed of the obstacle's presence by a source media library or a user, and in order to maintain operations, the MMU 100 may be instructed to return to a previous location, calculate a new route, and travel alone the new route to move to the destination library. Furthermore, the MMU 100 may include obstacle locations as a factor when calculating an optimum travel protocol in order to avoid repeated collisions, backtracking, and generally to improve mobility and efficiency.

As envisioned, a GBLS 500 may include any number of media libraries 300 and MMUs 100 capable of being interfaced in a network environment and housed within a storage facility. The media libraries 300 may be networked in any manner as understood by one having ordinary skill in the art.

Furthermore, in one embodiment, a MMU 100 may sense at least an approximate location of the MMU 100 in relation to the pathways 502 and libraries 300 and transport one or more media cartridges to a destination media library.

In another embodiment, the MMU 100 may recharge a power source of the MMU 100 when the MMU 100 is docked at either of the source media library and the destination media library.

Also, in some embodiments, transporting the one or more media cartridges to the destination media library may comprise using a laser barcode reader to read a first barcode (indicator 506) of a plurality of barcodes 506 positioned on one or more surfaces in the grid system 500 at least between a source media library and a destination media library (any of media libraries 300). Each of the plurality of barcodes indicates at least an approximate location of the MMU 100 in the grid system 500, and the MMU 100 is moved from a first barcode in a direction for causing the MMU 100 to arrive at a second barcode of the plurality of barcodes positioned in the grid system 500, the direction being based on at least one of: a location of the first barcode and a location of the destination media library, and using, the laser barcode reader to read the second barcode.

In more embodiments, sensing the at least an approximate location of the MMU 100 comprises at least one of sensing objects near the MMU 100, sensing when the holding portion is aligned with a cartridge holder of the source media library, and sensing a position of the MMU 100 in the GBLS 500.

Sensing the position of the MMU 100 in the GBLS 500 comprises at least one of: reading barcodes positioned on one or more surfaces in the GBLS 500 to determine the position of the MMU 100 in the GBLS 500 and using a RFID device to sense RFID devices positioned in the GBLS 500 to determine the position of the MMU 100 in the GBLS 500. In one embodiment, the first RFID device may comprise a RFID reader capable of reading RFID tags positioned in the GBLS 500 at least between the source media library and the destination media library for indicating the position of the MMU 100 in the GBLS 500.

According to one embodiment, the source media library may be configured to send a message to a destination media library when a media cartridge from the source media library is sent to the destination media library, and the source media library may be configured to receive a message from the destination media library when the destination media library receives the media cartridge from the source media library.

In another embodiment, the destination media library may be configured to receive a message from a source media library when a media cartridge from the source media library is sent the destination media library, and the destination media library may be configured to send a message to the source media library when the destination media library receives the media cartridge from the source media library.

Figure 6:
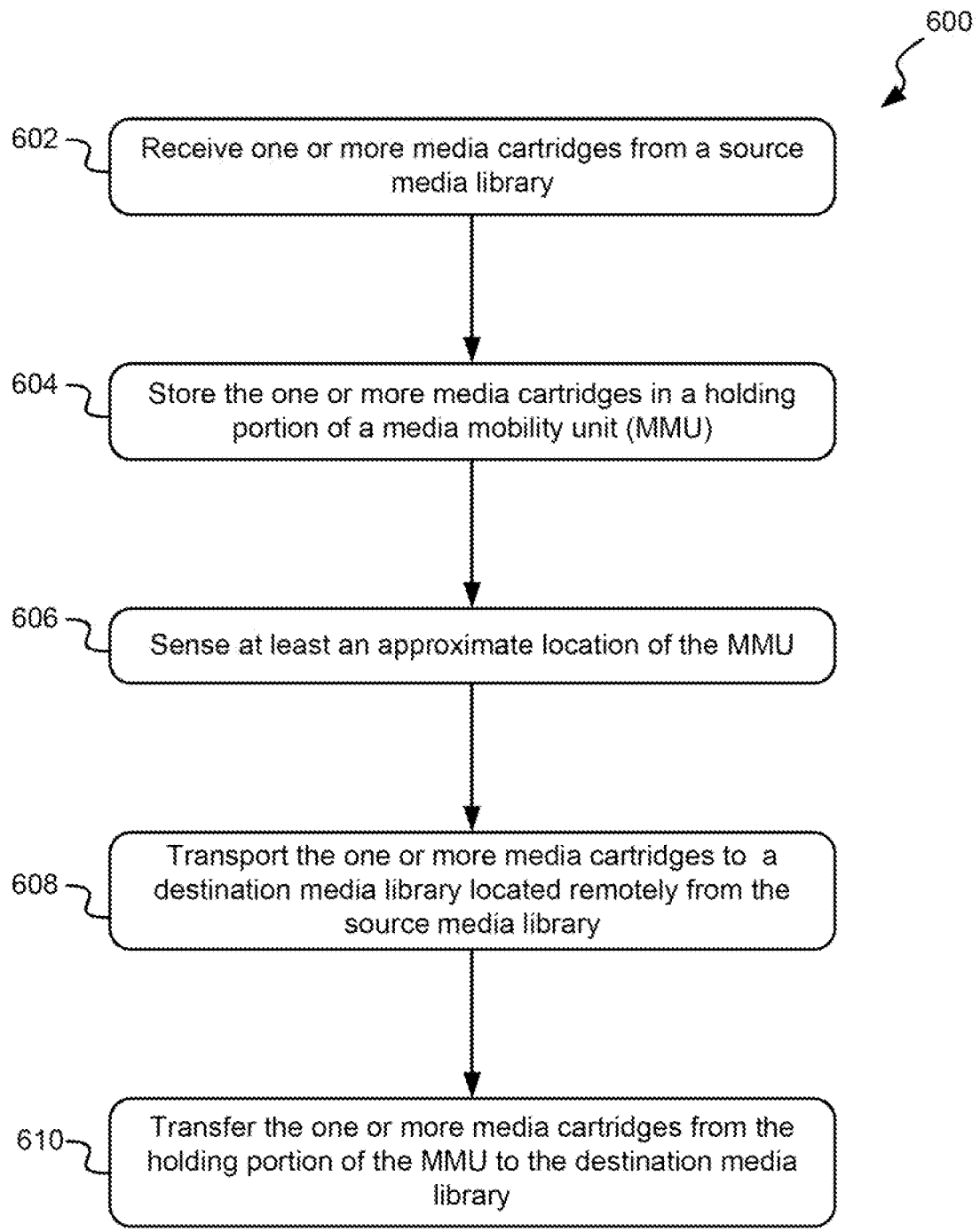
FIG. 6 is a flow diagram of a method, according to one embodiment.

Referring now to FIG. 6, a method for using one or more MMUs 100 in a GBLS 500 is shown, according to one embodiment. The method 600 may be carried out in any desired environment and may make use of any components, including those shown in FIGS. 1-5, among others.

In operation 602, one or more media cartridges are received from a source media library. The source media library may include a media cartridge, such as a tape cartridge, that is to be transported to a destination library.

In operation 604, the one or more media cartridges are stored in a holding portion of a MMU. The holding portion of the MMU may hold other media cartridges for transport, or may hold other types of media to be transported, in various embodiments. In one approach, this may be accomplished using a picker of the source media library to capture the media cartridges from the media library and placing them in the holding portion of the MMU, as would be apparent to one of skill upon reading the present descriptions.

in operation 606, at least an approximate location of the MMU is sensed. The approximate location may be sensed periodically, when encountering, indicators, or in any other way as would be understood by one of skill in the art upon reading the present descriptions.

In one embodiment, the approximate location may be sensed based on sensing objects near the MMU, sensing when the holding portion is aligned with a cartridge holder of the source media library, and sensing a position of the MMU in a grid system.

In a further embodiment, sensing the position, of the MMU in the grid system may comprise at least one of reading barcodes positioned on one or more surfaces in the grid system to determine the position of the MMU in the grid system, and using a first RFID device to sense RFID devices positioned in the grid system to determine the position of the MMU in the grid system.

Additionally, in some approaches, the first RFID device may comprise a RFID reader capable of reading RFID tags positioned in the grid system at least between the source media library and the destination media library for indicating the position of the MMU in the grid system.

In operation 608, the one or more MMUs are transported to a destination media library located remotely from the source media library where the one or more media cartridges may be delivered to the destination media library.

According to one embodiment, a laser barcode reader may be used to read a first barcode of a plurality of barcodes positioned on one or more surfaces in a grid system at least between the source media library and the destination media library, wherein each of the plurality of barcodes indicates at least an approximate location of the MMU in the grid system. Also, the MMU may be moved from the first barcode in a direction for causing the MMU to arrive at a second barcode of the plurality of barcodes positioned in the grid system, the direction being based on at least one of a location of the first barcode and a location of the destination media library. Furthermore, the laser barcode reader may be used to read the second barcode to repeat the process.

In operation 610, the one or more media cartridges are transferred from the holding portion of the MMU to the destination media library. In one approach, this may be accomplished using a picker of the destination media library to capture the media cartridges from the holding portion of the MMU and placing them in the media library, as would be apparent to one of skill upon reading the present descriptions.

According to one embodiment, the MMU may comprise a media cartridge holding portion for storing the one or more media cartridges, a sensing mechanism for sensing at least an approximate location of the MMU in relation to other objects, a drive mechanism for moving the MMU from the source media library to the destination media library, and a power source electrically coupled to at least one of the sensing mechanism and the drive mechanism for providing current to the at least one of the drive mechanism and the sensing mechanism.

In some embodiments, the power source may be recharged when the MMU is docked at either of the source media library and the destination media library.

In one embodiment, a data storage system comprises a MMU comprising a media cartridge holding portion for storing media cartridges, and a source media library. The source media library is configured to send a message to a destination media library when a media cartridge from the source media library is sent to the destination media library, and the source media library is configured to receive a message from the destination media library when the destination media library receives the media cartridge from the source media library.

In another embodiment, a data storage system comprises a MMU comprising a media cartridge holding portion for storing media cartridges, and a destination media library. The destination media library is configured to receive a message from a source media library when a media cartridge from the source media library is sent to the destination media library, and the destination media library is configured to send a message to the source media library when the destination media library receives the media cartridge from the source media library.

The data storage system may further comprise either or both of the destination media library and the source media library, wherein the destination media library may be located remotely from the source media library, according to various embodiments.

In another embodiment, the data storage system may further comprise the MMU and a grid system at least between the source media library and the destination media library comprising a plurality of indicators on one or more surfaces. The MMU may comprise a drive mechanism for moving the holding portion from the source media library to the destination media library, at least one proximity sensor for sensing objects near the MMU, a fiducial sensor for aligning the holding portion with a cartridge holder of at least one of the source media library and the destination media library, and at least one position reading mechanism for sensing the plurality of indicators for indicating at least an approximate location of the MMU in the grid system, wherein the MMU uses the at least the approximate location to determine a next movement of the MMU.

In a further embodiment, the MMU may further comprise a power source electrically coupled to the at least one proximity sensor, the fiducial sensor, the at least one position reading mechanism, and the drive mechanism for providing current to the at least one proximity sensor, the fiducial sensor, the at least one position reading mechanism, and the drive mechanism. The drive mechanism may comprise a motor for providing rotation to each of a first drive wheel and a second drive wheel independently, the first and second drive wheels positioned opposite each other near the holding portion for propelling the MMU, and a swiveling caster wheel for allowing, directional changes of the MMU positioned to provide stability to the MMU. The plurality of indicators may comprise a plurality of barcodes and the at least one position reading mechanism may comprise at least one laser barcode reader for reading the plurality of barcodes positioned on the one or more surfaces in the grid system.

In another embodiment, a media cartridge mobility system includes a grid system (such as that described in relation to FIG. 5) at least between a source media library and a destination media library located remotely from the source media library. The grid system comprises a plurality of indicators 506 (which may be barcodes, RFID devices, etc.) on one or more surfaces, the plurality of indicators being positioned to be readable by a position reading mechanism on the MMU (such as a barcode reader, an RFID reader, etc.). The system also includes a MMU (such as that described in relation to FIG. 1), the MMU including a media cartridge holding portion for storing media cartridges, a drive mechanism for moving the holding portion from a source media library to a destination media library, at least one proximity sensor for sensing objects near the MMU, a fiducial sensor for aligning the holding portion with a cartridge holder of at least one of the source media library and the destination media library, at least one position reading mechanism (such as a laser barcode reader, an RFID reader, etc.) for sensing the plurality of indicators positioned on the one or more surfaces in the grid system for indicating at least an approximate location of the MMU in the grid system, wherein the MMU uses the it least the approximate location to determine a next movement of the MMU, a power source electrically coupled to the at least one proximity sensor, the fiducial sensor, the at least one position reading mechanism, and the drive mechanism for providing current to the at least one proximity sensor, the fiducial sensor, the at least one position reading mechanism, and the drive mechanism. The drive mechanism includes: a motor for providing rotation to each of a first drive wheel and a second drive wheel independently, the first and second drive wheels positioned opposite each other near the holding portion for propelling the MMU, and a swiveling caster wheel for allowing directional changes of the MMU positioned to provide stability to the MMU.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method for transporting a media cartridge, the method comprising:
    receiving one or more media cartridges from a source media library;
    storing the one or more media cartridges in a media mobility unit (MMU),
    wherein the MMU is configured to store multiple media cartridges simultaneously;
    sensing at least an approximate location of the MMU;
    transporting the one or more media cartridges to a destination media library located remotely from the source media library; and
    transferring the one or more media cartridges from the MMU to the destination media library,
    wherein the MMU comprises a drive mechanism for moving the MMU from the source media library to the destination media library, and a media cartridge holding portion for storing the one or more media cartridges,
    wherein the drive mechanism comprises:
        a motor for providing rotation to each of a first drive wheel and a second drive wheel independently;
        the first and second drive wheels positioned opposite each other near the holding portion for propelling the MMU; and
        a swiveling caster wheel for allowing directional changes of the MMU positioned to provide stability to the MMU.

2. The method as recited in claim 1, wherein the MMU comprises:
    a sensing mechanism for sensing at least an approximate location of the MMU in relation to other objects;
    a power source electrically coupled to at least one of the sensing mechanism and the drive mechanism for providing current to the at least one of the drive mechanism and the sensing mechanism.

3. The method as recited in claim 2, further comprising recharging the power source when the MMU is docked at either of the source media library and the destination media library.

4. The method as recited in claim 1, wherein transporting the one or more media cartridges to the destination media library comprises:
    using a laser barcode reader to read a first barcode of a plurality of barcodes positioned on one or more surfaces in a grid system at least between the source media library and the destination media library, wherein each of the plurality of barcodes indicates at least an approximate location of the MMU in the grid system;
    moving the MMU from the first barcode in a direction for causing the MMU to arrive at a second barcode of the plurality of barcodes positioned in the grid system, the direction being based on at least one of: a location of the first barcode and a location of the destination media library; and
    using the laser barcode reader to read the second barcode.

5. The method as recited in claim 1, wherein sensing the at least an approximate location of the MMU comprises at least one of:
    sensing objects near the MMU;
    sensing when the media cartridge holding portion of the MMU is aligned with a cartridge holder of the source media library; and
    sensing a position of the MMU in a grid system.

6. The method as recited in claim 5, wherein sensing the position of the MMU in the grid system comprises at least one of:
    reading barcodes positioned on one or more surfaces in the grid system to determine the position of the MMU in the grid system, wherein each of the barcodes indicates at least an approximate location of the MMU in the grid system; and
    using a first radio frequency identification (RFID) device to sense RFID devices positioned in the grid system to determine the position of the MMU in the grid system, wherein the first RFID device comprises a RFID reader capable of reading RFID tags positioned in the grid system at least between the source media library and the destination media library for indicating the position of the MMU in the grid system.

7. The method as recited in claim 1, wherein the transporting is performed using a grid system at least between the source media library and the destination media library, the grid system comprising a plurality of indicators on one or more surfaces,
    wherein the MMU comprises:
        a drive mechanism for moving the media cartridge holding portion of the MMU from the source media library to the destination media library;
        a fiducial sensor for aligning the media cartridge holding portion with a cartridge holder of at least one of the source media library and the destination media library; and
        at least one position reading mechanism for sensing the plurality of indicators for indicating at least an approximate location of the MMU in the grid system, wherein the MMU uses at least the approximate location to determine a next movement of the MMU.

8. The method as recited in claim 7, wherein the MMU comprises a rechargeable battery for providing electricity to the drive mechanism, the battery being adapted for recharging when the MMU is docked at a media library.

9. The method as recited in claim 1, wherein the MMU is configured to store multiple media cartridges of the same type.

10. The method as recited in claim 1, wherein the MMU is configured to store multiple media cartridges of different types.

11. The method as recited in claim 1, wherein the MMU receives and stores the multiple media cartridges.

12. The method as recited in claim 11, wherein the MMU transports the multiple media cartridges stored therein to the destination media library.

13. The method as recited in claim 11, wherein the multiple media cartridges are stored in a plurality of storage slots of the MMU.

14. A method for transporting a media cartridge, the method comprising:
- receiving one or more media cartridges from a source media library;
- storing the one or more media cartridges in a media mobility unit (MMU), wherein the MMU is configured to store multiple media cartridges simultaneously;
- sensing at least an approximate location of the MMU;
- transporting the one or more media cartridges to a destination media library located remotely from the source media library; and
- transferring the one or more media cartridges from the MMU to the destination media library,
- wherein the transporting is performed using a grid system at least between the source media library and the destination media library, the grid system comprising a plurality of indicators on one or more surfaces,
- wherein the MMU comprises:
  - a drive mechanism for moving a media cartridge holding portion of the MMU from the source media library to the destination media library;
  - a fiducial sensor for aligning the media cartridge holding portion with a cartridge holder of at least one of the source media library and the destination media library;
  - at least one position reading mechanism for sensing the plurality of indicators for indicating at least an approximate location of the MMU in the grid system, wherein the MMU uses at least the approximate location to determine a next movement of the MMU; and
  - a power source electrically coupled to the fiducial sensor, the at least one position reading mechanism, and the drive mechanism for providing current to the fiducial sensor, the at least one position reading mechanism, and the drive mechanism,
- wherein the drive mechanism comprises:
  - a motor for providing rotation to each of a first drive wheel and a second drive wheel independently;
  - the first and second drive wheels positioned opposite each other near the holding portion for propelling the MMU; and
  - a swiveling caster wheel for allowing directional changes of the MMU positioned to provide stability to the MMU,
- wherein the plurality of indicators comprise a plurality of barcodes, and
- wherein the at least one position reading mechanism comprises at least one laser barcode reader for reading the plurality of barcodes positioned on the one or more surfaces in the grid system.

* * * * *